United States Patent
Froese et al.

(10) Patent No.: US 9,381,925 B2
(45) Date of Patent: Jul. 5, 2016

(54) RAIL VEHICLE COMPRISING A FROST-PROTECTED WATER OUTLET PIPE

(71) Applicant: SIEMENS AKTIENGESELLSCHAFT, Munich (DE)

(72) Inventors: Juergen Froese, Krefeld (DE); Heinrich Kohnen, Kempen (DE); Christof Rohlof, Neukirchen-Viuyn (DE)

(73) Assignee: Siemens Aktiengesellschaft, Mue (DE)

( * ) Notice: Subject to any disclaimer, the term of this patent is extended or adjusted under 35 U.S.C. 154(b) by 99 days.

(21) Appl. No.: 14/377,514

(22) PCT Filed: Jan. 11, 2013

(86) PCT No.: PCT/EP2013/050436
§ 371 (c)(1),
(2) Date: Aug. 8, 2014

(87) PCT Pub. No.: WO2013/117377
PCT Pub. Date: Aug. 15, 2013

(65) Prior Publication Data
US 2015/0013782 A1    Jan. 15, 2015

(30) Foreign Application Priority Data
Feb. 8, 2012 (DE) .......... 10 2012 201 851

(51) Int. Cl.
*F16L 53/00* (2006.01)
*B61D 35/00* (2006.01)
*A47K 11/00* (2006.01)
*B61D 27/00* (2006.01)

(52) U.S. Cl.
CPC ............. *B61D 35/00* (2013.01); *A47K 11/00* (2013.01); *B61D 27/0036* (2013.01); *F16L 53/004* (2013.01); *F16L 53/008* (2013.01); *Y10T 137/6877* (2015.04)

(58) Field of Classification Search
CPC ..... F16L 53/004; F16L 53/008; F16L 53/005; F16L 53/001; F16L 53/00; B61D 27/0045; Y10T 137/6877
USPC .................................................... 285/41, 21.2
See application file for complete search history.

(56) References Cited

U.S. PATENT DOCUMENTS

| | | | | |
|---|---|---|---|---|
| 1,845,277 A | | 2/1932 | Hurlburt | |
| 2,599,671 A | * | 6/1952 | Thompson | F16L 53/008 123/142.5 E |
| 4,838,477 A | * | 6/1989 | Roach | B23K 37/003 228/200 |
| 5,156,523 A | * | 10/1992 | Maier | F16L 39/04 277/361 |
| 5,290,996 A | * | 3/1994 | Giamati | B64C 1/1453 219/201 |
| 5,713,265 A | * | 2/1998 | Strader | F24C 15/14 126/41 R |

(Continued)

FOREIGN PATENT DOCUMENTS

| DE | 61009 A1 | 4/1968 |
|---|---|---|
| DE | 93357 A1 | 10/1972 |

(Continued)

*Primary Examiner* — David E Bochna
(74) *Attorney, Agent, or Firm* — Laurence Greenberg; Werner Stemer; Ralph Locher

(57) ABSTRACT

A rail vehicle has a water outlet pipe. An end piece of the water outlet pipe is connected to an opening in a floor plate of the rail vehicle. A heated plate is provided at the end piece and disposed parallel to the floor plate. The heated plate is formed with an opening that is adapted to a free cross-section of the end piece of the water outlet pipe.

10 Claims, 1 Drawing Sheet

(56) References Cited

U.S. PATENT DOCUMENTS

| | | | | |
|---|---|---|---|---|
| 5,975,119 A * | 11/1999 | Silva | F16L 53/008 137/341 |
| 6,211,494 B1 * | 4/2001 | Giamati | B64C 1/1453 219/201 |
| 6,425,554 B1 * | 7/2002 | Moreland | B64D 11/02 244/1 R |
| 6,435,452 B1 * | 8/2002 | Jones | B64C 1/1453 244/1 A |
| 6,727,481 B1 * | 4/2004 | Wilds | F16L 53/008 219/549 |
| 8,452,167 B2 * | 5/2013 | Leonard | F16L 53/008 239/135 |
| 2002/0166988 A1 * | 11/2002 | Degutis | F16K 17/04 251/144 |
| 2003/0190162 A1 * | 10/2003 | Hersh | F16L 53/008 392/468 |
| 2005/0139278 A1 * | 6/2005 | Thompson | F16L 53/002 138/32 |
| 2013/0068752 A1 * | 3/2013 | Reynolds | F16L 53/008 219/523 |
| 2013/0160475 A1 * | 6/2013 | Vinz | F25D 21/14 62/247 |

FOREIGN PATENT DOCUMENTS

| | | |
|---|---|---|
| DE | 271353 A1 | 8/1989 |
| GB | 1546875 A | 5/1979 |

* cited by examiner

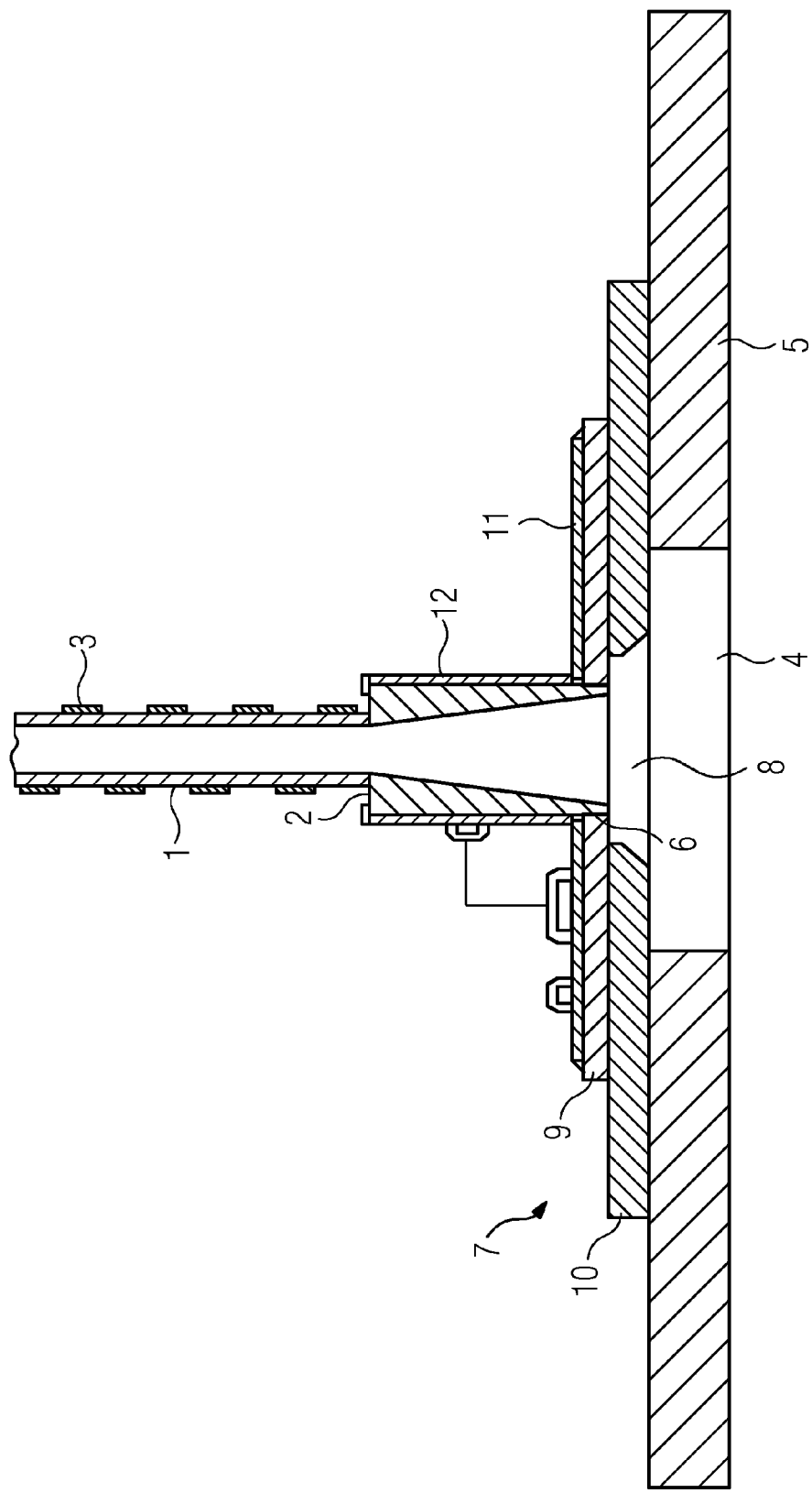

RAIL VEHICLE COMPRISING A FROST-PROTECTED WATER OUTLET PIPE

BACKGROUND OF THE INVENTION

Field of the Invention

The invention relates to a rail vehicle comprising a water outlet pipe, the end piece of which is connected to an opening in a floor plate of the rail vehicle.

Water outlet pipes of this type are designed to be heated particularly in the region of their end piece such that, when low temperatures occur, freezing over of the water outlet pipe at their outlet point is reliably avoided. Such a heating device is frequently present as a heating tape which is wound around the water outlet pipe. In principle, in the case of rail vehicles, all the water pipes, which are laid under the floor, are equipped with heating tapes.

Gray water, for example, which occurs in the galley region of the rail vehicle during normal operation of a water system, must be guided away to a track bed. Such a gray-water outlet pipe or drainage pipe terminates with the feed-through through a floor plate of the rail vehicle. In the event that the outlet point of the gray-water drainage pipe freezes over, gray water which occurs can no longer be guided away and can accumulate in the galley.

BRIEF SUMMARY OF THE INVENTION

Taking this as a starting point, the object on which the invention is based is to further develop the rail vehicle mentioned at the outset in such a way that increased frost protection is achieved for the outlet point of the water outlet pipe.

This object is achieved in that a heated plate is provided at the end piece of the water outlet pipe, is arranged parallel to the floor plate and has an aperture which is adapted to a free cross section of the end piece of the water outlet pipe.

The heated plate thus provides an effective heat source at the outlet point of the water outlet pipe, this heat source effectively preventing freezing over of the end piece of the water outlet pipe even at low temperatures.

The heated plate is preferably designed as a flat round plate.

The heated plate can enclose the end piece of the water outlet pipe such that there is thermal contact between the heated plate and the end piece.

It is advantageous if an areally acting heating device, which can be designed in particular as a heating mat, is provided on the side of the heated plate which is opposite to the floor plate. In this way, effective heating of the plate takes place.

Moreover, a circumferential surface of the end piece of the water outlet pipe can be provided with an areally acting heating device which likewise can again be designed as a heating mat. Both the heating device for the end piece and the heating device for the heated plate can have a common electrical power supply.

The heated plate can have two partial plates lying over one another, of which the partial plate remote from the floor plate is heated and the partial plate which is situated closer to the floor plate is designed as a heat-conducting plastic plate. This design has the advantage that, while maintaining the heated partial plate, an overall height of the heated plate can be varied by adapting a height of the plastic plate.

Preferably, a free cross section of the aperture in the heated plate increases in the direction of the floor plate. This increase can be constant or stepwise. This design assists frost protection at the water outlet.

It is advantageous if a free cross section of the opening in the floor plate is larger than a free cross section of the aperture in the heated plate. In this case, part of the surface of the heated plate which faces the floor plate is exposed and can counteract freezing over in the region of the end piece of the water outlet pipe.

Preferably, for example with a cylindrically symmetrical design of the end piece of the water outlet pipe, of the heated plate and of the opening in the floor plate, a free cross section of the opening in the floor plate corresponds to at least 1.5 times the free cross section of the aperture in the heated plate. In this way, a considerable part of the surface of the heated plate is exposed.

An exemplary embodiment of the invention will be explained in even more detail below with reference to the drawing.

BRIEF DESCRIPTION OF THE DRAWING

The single FIGURE shows a cross-sectional representation of an end region of a water outlet pipe shown together with a portion of a floor plate of a rail vehicle.

DESCRIPTION OF THE INVENTION

The FIGURE shows a water outlet pipe 1 coming, for example, from a galley of a rail vehicle and having an end piece 2 which, in the present exemplary embodiment, is provided as a separate component. It is also conceivable that the water outlet pipe 1 maintains its external shape as far as the lower edge, as seen in the FIGURE, of the end piece 2.

Outside the end piece 2, a heating tape 3 is wound around the water outlet pipe 1 for protection against the effects of frost.

The end piece 2 of the water outlet pipe 1 is connected to an opening 4 in a floor plate 5 of the rail vehicle.

A floor plate-side edge 6 of the end piece 2 is enclosed by a heated plate 7 which has a central aperture 8 which is adapted to a free cross section of the end piece 2 in the region of the edge 6. The plate 7 is arranged parallel to the floor plate 5 and constructed from two partial plates 9, 10 arranged over one another. Here, the partial plate 9 remote from the floor plate 5 is embodied as a metallic disk plate, whereas the partial plate 10 arranged between the disk plate 9 and the floor plate 5 is produced from a heat-conducting plastic, for example from Vulkollan®. Whereas the partial plate 9 encloses the edge 6 of the end piece 2, the partial plate 10 shows a free cross section which increases in the direction of the floor plate 5.

This free cross section is in turn dimensioned to be smaller than that of the opening 4 in the floor plate 5.

It should be emphasized that the described arrangement is embodied to be generally cylindrically symmetrical. In this respect, a diameter of the opening 4 in the floor plate 5 exceeds the maximum diameter of the aperture 8 in the plate 7 such that a surface region of the partial plate 10 which faces the floor plate 5 is exposed. A heating mat 11 is arranged on the partial plate 9 and provides a large-area heating of the plate 7 overall. In this way, favorable frost protection for the water outlet pipe 1, in particular in the region of its outlet point, is achieved.

The end piece 2 is also provided at its circumference with a heating mat 12 which, together with the heating mat 11, can be supplied with electrical power.

The invention claimed is:

1. A rail vehicle, comprising:
a floor plate formed with an opening;
a water outlet pipe having an end piece connected to and communicating with said opening formed in said floor plate of the rail vehicle, said end piece having a free cross section; and
a heated plate disposed at said end piece parallel to said floor plate, said heated plate having an aperture formed therein that is adapted to said free cross section of said end piece of said water outlet pipe, and said aperture having a free cross section increasing through said plate in a direction toward said floor plate.

2. The rail vehicle according to claim 1, wherein said heated plate is a flat, round plate.

3. The rail vehicle according to claim 1, wherein said heated plate envelopes said end piece of said water outlet pipe.

4. The rail vehicle according to claim 1, which comprises a heating device disposed on a side of said heated plate opposite from said floor plate.

5. The rail vehicle according to claim 4, wherein said heating device for said heated plate is a heating mat.

6. The rail vehicle according to claim 1, which comprises a heating device disposed on a circumferential surface of said end piece of said water outlet pipe.

7. The rail vehicle according to claim 6, wherein said heating device for said end piece of said water outlet pipe is a heating mat.

8. The rail vehicle according to claim 1, wherein a free cross section of said opening in said floor plate is larger than a free cross section of said aperture in said heated plate.

9. The rail vehicle according to claim 8, wherein the free cross section of said opening in said floor plate amounts to at least 1.5 times the free cross section of said aperture in said heated plate.

10. A rail vehicle, comprising:
a floor plate formed with an opening;
a water outlet pipe having an end piece connected to and communicating with said opening formed in said floor plate of the rail vehicle, said end piece having a free cross section; and
a heated plate disposed at said end piece parallel to said floor plate, said heated plate having an aperture formed therein that is adapted to said free cross section of said end piece of said water outlet pipe, said heated plate including two partial plates lying over one another, said partial plates including a heated partial plate remote from said floor plate and a heat-conducting plastic plate situated closer to said floor plate.

* * * * *